United States Patent
Gupta

(10) Patent No.: US 8,392,237 B2
(45) Date of Patent: Mar. 5, 2013

(54) COMPLIANCE METHODOLOGY

(75) Inventor: Poornima Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 184 days.

(21) Appl. No.: 12/698,952

(22) Filed: Feb. 2, 2010

(65) Prior Publication Data
US 2011/0191146 A1    Aug. 4, 2011

(51) Int. Cl.
*G06Q 10/00*  (2012.01)
*G06Q 40/00*  (2012.01)

(52) U.S. Cl. .............. 705/7.28; 705/7.38; 705/7.39; 705/317

(58) Field of Classification Search ........... 705/7.28, 705/7.38, 7.39, 317
See application file for complete search history.

(56) References Cited

U.S. PATENT DOCUMENTS

| | | | |
|---|---|---|---|
| 6,349,290 B1 * | 2/2002 | Horowitz et al. | 705/35 |
| 7,225,051 B1 * | 5/2007 | Christensen et al. | 700/193 |
| 7,313,531 B2 | 12/2007 | Chappel et al. | |
| 7,493,277 B1 | 2/2009 | Uhl et al. | |
| 7,505,918 B1 | 3/2009 | Spielmann et al. | |
| 2003/0229525 A1 | 12/2003 | Callahan et al. | |
| 2005/0075916 A1 * | 4/2005 | Lathram et al. | 705/7 |
| 2006/0074700 A1 * | 4/2006 | Ricketts | 705/1 |
| 2006/0282276 A1 * | 12/2006 | Venzon et al. | 705/1 |
| 2007/0226721 A1 * | 9/2007 | Laight et al. | 717/154 |
| 2008/0015913 A1 * | 1/2008 | Courtney et al. | 705/7 |
| 2008/0288330 A1 * | 11/2008 | Hildebrand et al. | 705/10 |

OTHER PUBLICATIONS

Keith E Monson. (Sep. 2004). Compliance Risk-Rating Solutions. ABA Bank Compliance, 25(9), 14-25.*
Pannkuk, Lois; Bauman, Dodie. Avoiding the perils of noncompliance. ABA Bank Compliance 22. 5 (May/Jun. 2001): 40-52.*
International Search Report and Written Opinion mailed Mar. 25, 2011 in International Application No. PCT/US2001/023116.

* cited by examiner

*Primary Examiner* — Lynda Jasmin
*Assistant Examiner* — Timothy Padot
(74) *Attorney, Agent, or Firm* — Banner & Witcoff, Ltd.; Michael A. Springs

(57) ABSTRACT

Methods, computer readable media, and apparatuses for evaluating compliance with laws, regulations, and/or policies are presented. A metric definition for a metric may be received, the metric measuring an aspect of a business process. The measured aspect may represent a compliance concern. A first sigma score for the metric may be determined based on a number of opportunities and a number of defects. A second sigma score for the business process may be determined. A third sigma score for a business unit may be determined, the business unit implementing the business process. A fourth sigma score for a business segment may be determined, the business segment managing the business unit. A report may be generated, the report including the first sigma score, the second sigma score, the third sigma score, and the fourth sigma score.

24 Claims, 7 Drawing Sheets

COMPLIANCE METHODOLOGY

BACKGROUND

Governments, organizations, and other entities often adopt laws, regulations, policies, procedures, and the like for a variety of reasons and in a plurality of areas. Increasingly, governments, organizations, and other entities are striving to bring their processes into compliance with such laws, regulations, policies, procedures, and the like. As organizations grow and processes become more complex, however, monitoring, evaluating, and/or ensuring compliance may become more difficult.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to evaluating compliance with laws, regulations, and/or policies. According to one or more aspects, a metric definition for at least one metric may be received, and the at least one metric may measure an aspect of at least one business process. A business process may include any process performed by an organization and/or other entity, and a metric definition may define one or more attributes of a metric, where the metric measures one or more aspects of a business process. Subsequently, a number of opportunities and a number of defects for the at least one metric may be determined based on the metric definition. Then, a first sigma score for the at least one metric may be determined based on the number of opportunities and the number of defects. Thereafter, a second sigma score for the at least one business process may be determined. Subsequently, a third sigma score for at least one business unit may be determined, and the at least one business unit may implement the at least one business process. Then, a fourth sigma score for at least one business segment may be determined, and the at least one business segment may manage the at least one business unit. Thereafter, a report may be generated, and the report may include the first sigma score, the second sigma score, the third sigma score, and the fourth sigma score.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1A:
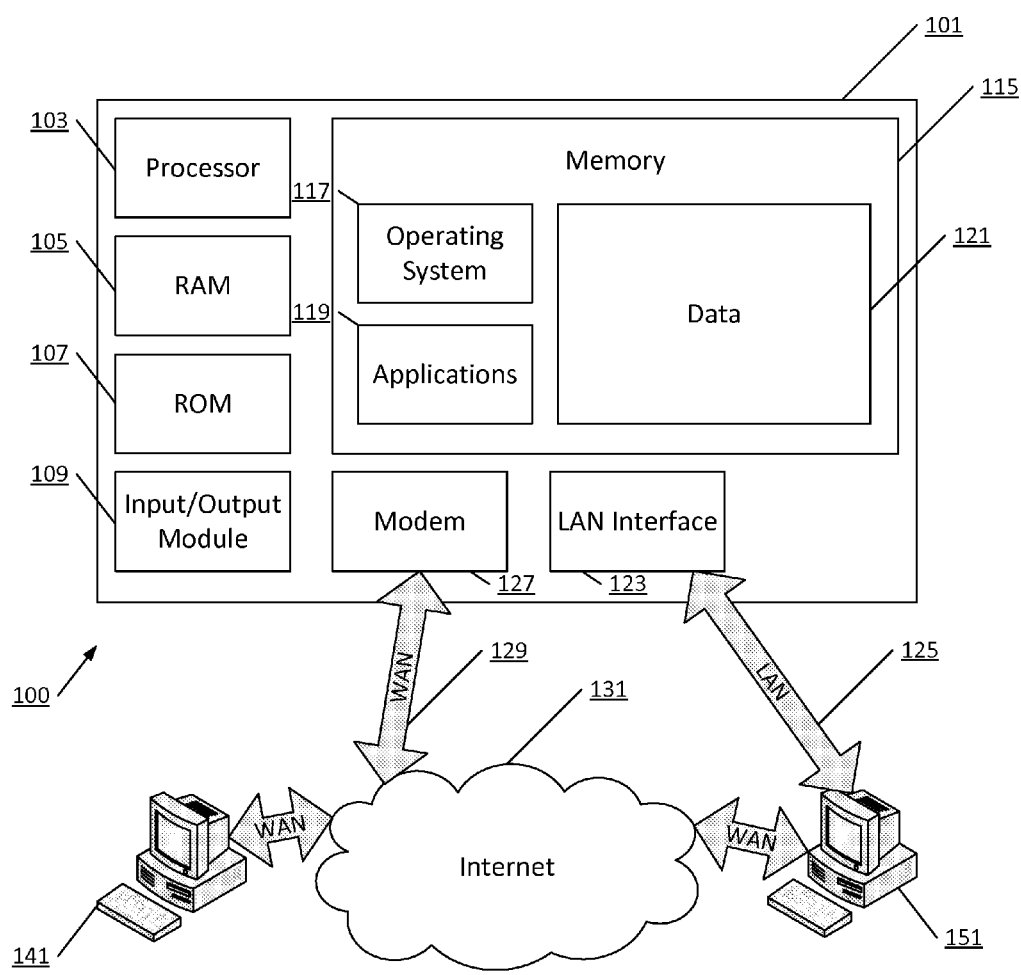
FIG. 1A illustrates a suitable operating environment in which various aspects of the disclosure may be implemented.

FIG. 1A illustrates a block diagram of a generic computing device 101 (e.g., a computer server) in computing environment 100 that may be used according to one or more illustrative embodiments of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual, and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of the computer executable instructions for server 101 may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
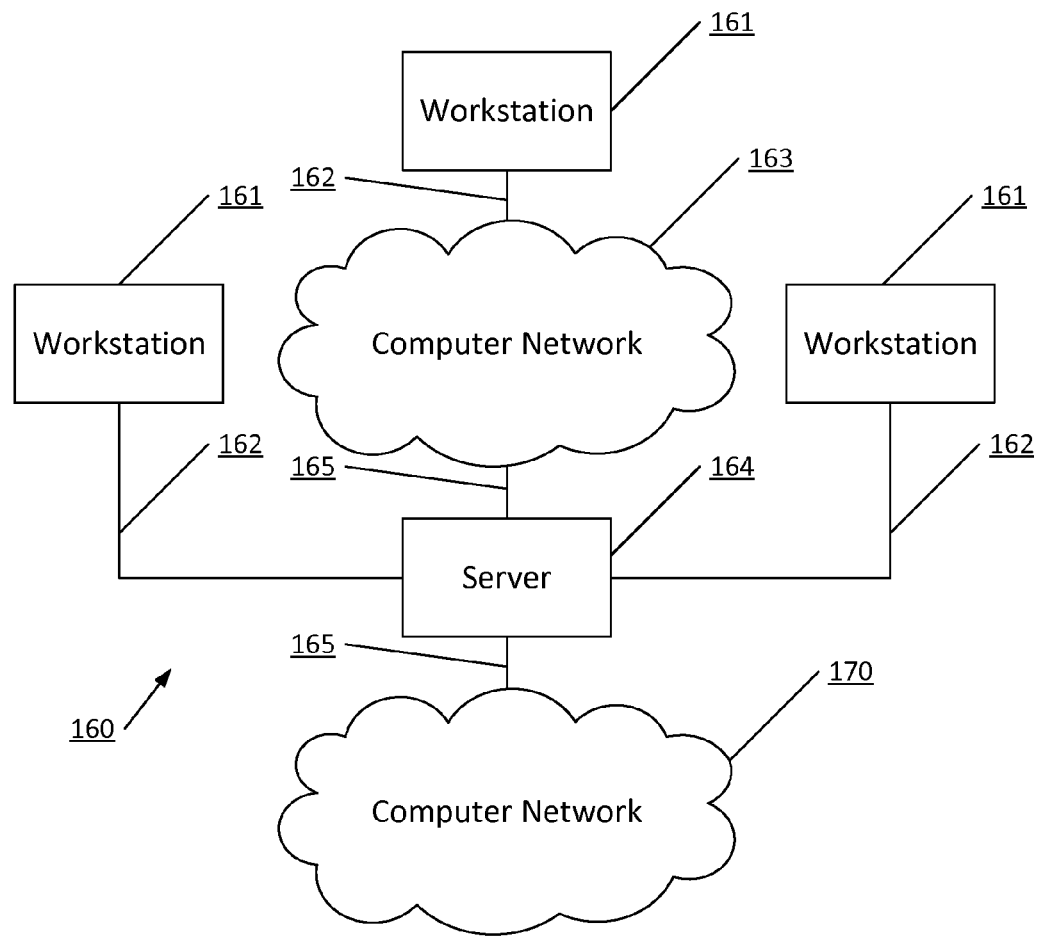
FIG. 1B illustrates a suitable system in which various aspects of the disclosure may be implemented.

FIG. 1B illustrates a suitable system 160 in which various aspects of the disclosure may be implemented. As illustrated, system 160 may include one or more workstations 161. Workstations 161 may be local or remote, and may be connected by one or communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

Computer network 163 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 162 and 165 may be any communications links suitable for communicating between workstations 161 and server 164, such as network links, dial-up links, wireless links, hard-wired links, and the like.

Figure 2:
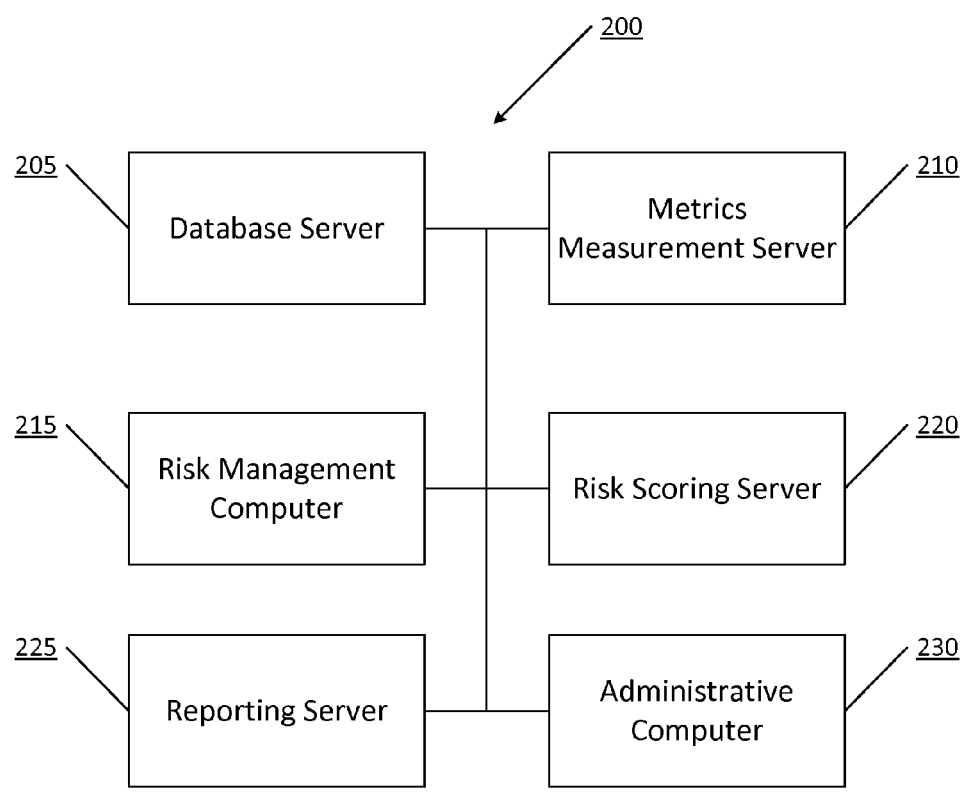
FIG. 2 illustrates a suitable network environment in which various aspects of the disclosure may be implemented.

FIG. 2 illustrates a suitable network environment in which various aspects of the disclosure may be implemented. Network environment 200 may include several computing devices. For example, network environment 200 may include database server 205, metrics measurement server 210, risk management computer 215, risk scoring server 220, reporting server 225, and administrative computer 230.

In one or more arrangements, database server 205 may store information about one or more business processes, one or more metric definitions for one or more metrics, approval information for one or more metrics, previously measured and/or analyzed historical process data, risk management information, one or more risk scores (e.g., sigma scores), one or more compliance reports (e.g., dashboard reports), administrative data, and/or other information and/or data as further described herein. For example, database server 205 may store historical process data, which may enable a system implementing one or more aspects of the disclosure to calculate a regression and/or perform trend analysis.

In at least one arrangement, metrics measurement server 210 may receive one or more metric definitions for one or more metrics, determine and/or measure a number of opportunities and a number of defects for one or more metrics corresponding to one or more business processes, and/or otherwise process data related to one or more metrics. For example, metrics measurement server 210 may receive a metric definition for a metric that measures an aspect of a business process, and subsequently, metrics measurement server 210 may measure and/or monitor the business process to determine, based on the metric definition, a number of opportunities and a number of defects in the process.

In at least one arrangement, risk management computer 215 may generate one or more user interfaces related to risk management, one or more business processes, one or more metrics and/or metric definitions, one or more compliance reports, and/or other information. Additionally or alternatively, risk management computer 215 may receive approval information for one or more metrics and/or other information as further described herein. For example, risk management computer 215 may generate one or more user interfaces allowing a user, such as a risk manager, to create, view, and/or edit one or more metrics and/or metric definitions, one or more compliance reports, and/or historical data related to one or more business processes. Such user interfaces, for instance, may allow a user to configure and/or interact with a system implementing one or more aspects of the disclosure.

In at least one arrangement, risk scoring server 220 may receive, process, and/or analyze information related to one or more metrics, one or more business processes, one or more business units, and/or one or more business segments. For example, risk scoring server 220 may receive, process, and/or analyze one or more metric definitions, opportunity and/or defect statistics, metric names and/or categories, process names and/or categories, unit names and/or categories, segment names and/or categories, and/or other information, as further described herein. Additionally or alternatively, risk scoring server 220 may calculate, based on received information and/or other information, one or more risk scores (e.g., sigma scores) for one or more metrics, one or more business processes, one or more business units, and/or one or more business segments.

For example, risk scoring server 220 may receive a metric definition for a metric (e.g., a definition of what constitutes an opportunity and what constitutes a defect in a particular business process), a metric name and category (e.g., the metric may be named "Privacy Guideline" and may be designated as within a category named "Privacy Metrics"), and opportunity and defect statistics corresponding to the metric (e.g., a quantity of opportunities and a quantity of defects determined to have occurred in the particular business process during a particular period of time). Subsequently, in such an example, risk scoring server 220 may calculate, based on the metric definition and the opportunity and defect statistics, a sigma score for the metric as further described herein. To calculate the sigma score for the metric, risk scoring server 220 may compute the result of an equation in a spreadsheet (e.g., risk scoring server 220 may calculate the result of a formula in a spreadsheet). For instance, risk scoring server 220 may calculate the sigma score for the metric by computing the result of a formula, such as "=NORMSINV(1−([quantity of opportunities]/[quantity of defects]))+1.5". The calculation of risk scores and sigma scores are described further below.

In at least one arrangement, reporting server 225 may receive, process, and/or analyze information related to one or more metrics, one or more business processes, one or more business units, and/or one or more business segments. For example, reporting server 225 may receive, process, and/or analyze one or more metric definitions, opportunity and/or defect statistics, metric names and/or categories, process names and/or categories, unit names and/or categories, segment names and/or categories, and/or other information, such as risk scores (e.g., sigma scores) for one or more metrics, one or more business processes, one or more business units, and/or or one or more business segments, as further described herein. For example, reporting server 225 may receive information related to a plurality of metrics measuring various aspects of a business process, the business process being implemented by a business unit, the business being managed by a business segment. Subsequently, in this example, reporting server 225 may generate a compliance report (e.g., a dashboard report, as further described herein) that may include at least one risk score (e.g., a sigma score) for each metric of the plurality of metrics, at least one risk score (e.g., a sigma score) for the business process, at least one risk score (e.g., a sigma score) for the business unit, and/or at least one risk score (e.g., a sigma score) for the business segment.

In at least one arrangement, administrative computer 230 may generate one or more user interfaces related to system configuration, system status, system logs, and/or other information. Such user interfaces, for example, may enable a user to configure and/or interact with a system implementing one or more aspects of the disclosure.

While network environment 200 is described as including various computers adapted to perform various functions, it should be understood that the system may be modified to include a greater or lesser number of computers which may be used alone or in combination to provide the same functionality. For example, a single computer may be used to perform all of the functions described, and one or more users may interact with the single computer through one or more terminals and/or user interfaces. In another example, a first computer may be used to perform all of the functions of database server 205 and metrics measurement server 210, a second computer may be used to perform all of the functions of risk management computer 215 and risk scoring server 220, and a third computer may be used to perform all of the functions of reporting server 225 and administrative computer 230. In addition, while risk score calculations are described with respect to business processes, business units, and business segments, similar calculations may be made and similar analysis may be performed with respect to a greater and/or lesser number of internal divisions and/or designations within an organization, such as a financial institution.

Figure 3:
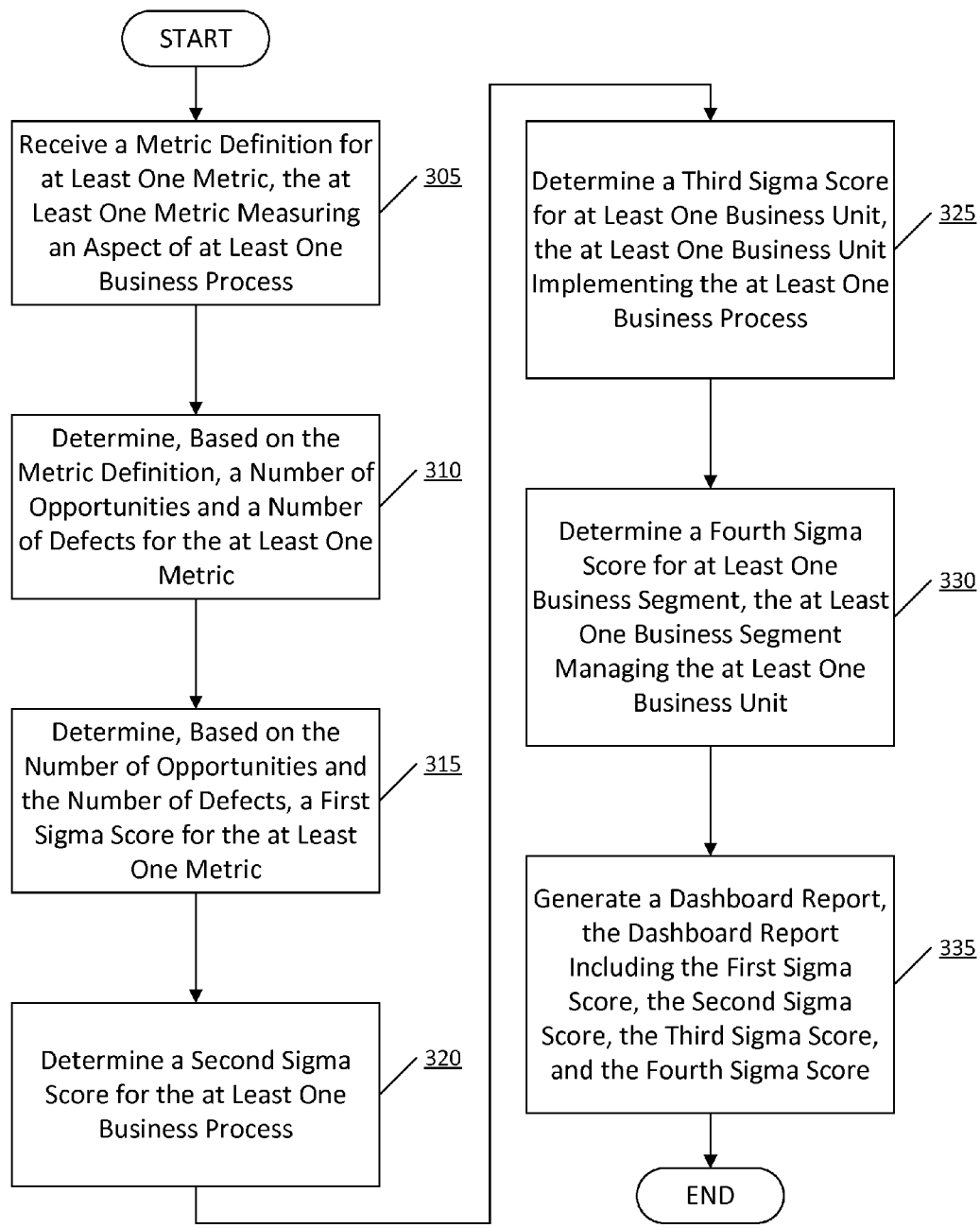
FIG. 3 illustrates a method by which compliance with laws, regulations, and/or policies may be evaluated according to one or more aspects described herein.

FIG. 3 illustrates a method by which compliance with laws, regulations, and/or policies may be evaluated according to one or more aspects described herein. According to one or more aspects, the methods described herein may be implemented by software executed on one or more computers, such as computing device 101, and/or in a network environment, such as network environment 200.

In step 305, a metric definition for at least one metric may be received, and the at least one metric may measure an aspect of at least one business process. A business process may include any process performed by an organization and/or other entity. For example, a business process may be a customer support process performed by a financial institution in which incoming telephone calls from customers are routed to different customer service representatives, where the customer service representatives assist the customers in resolving issues with products and/or services provided by the financial institution. In addition, a metric definition may define one or more attributes of a metric, where the metric measures one or more aspects of a business process. For instance, with regard to the example customer support process discussed above, a metric may measure how often a consumer privacy policy is violated when the process is performed, and a metric definition may define what constitutes an instance of the process (which may also be called an "opportunity") and what constitutes a violation of the particular policy (which may also be called a "defect").

In one or more arrangements, the aspect of the at least one business process measured by the at least one metric may represent a compliance concern. A compliance concern may include any concern related to a business process that arises from one or more laws, regulations, rules, policies, procedures, or the like, which the business process may implicate. For instance, a compliance concern may arise with respect to the example customer support process discussed above, as a financial institution performing such a process may be subject to consumer privacy laws and/or regulations that restrict the ways in which confidential customer information is handled. Because failing to comply with such laws and/or regulations may expose the financial institution to civil and/or criminal liability, the financial institution may wish to ensure that such laws are complied with as the process is performed, and thus, a compliance concern may exist with regard to the customer support process. In at least one arrangement, the compliance concern may arise from a legal obligation (e.g., it may arise from an obligation imposed by a law and/or regulation). In at least one additional arrangement, the compliance concern may arise from an internal policy (e.g., it may arise from an obligation imposed by an organization, such as a financial institution that may implement one or more aspects described herein).

Thus, in one example, a system implementing one or more aspects of the disclosure may receive a metric definition for a metric via one or more user interfaces. The metric may measure an aspect of a business process, and the aspect may represent a compliance concern arising from a legal obligation and/or an internal policy. For instance, the metric may measure, with respect to a customer support business process, a level of compliance of the customer support business process with a legal obligation and/or internal policy, such as a consumer privacy law or an internal privacy policy.

In one or more additional arrangements, receiving a metric definition for at least one metric further may include receiving approval for the at least one metric from a managing user. For example, in addition to receiving a metric definition for a metric via one or more user interfaces, the system also may receive approval for the metric from a managing user, such as a risk manager or business executive. In at least one arrangement, the system may contact a managing user automatically after a metric definition for a metric is received. For instance, after receiving a metric definition for a metric, the system automatically may generate and/or send an email to a managing user (e.g., a risk manager) that includes information about the metric definition and/or the metric. Such a communication may facilitate review and/or approval of the metric definition for the metric by the managing user.

In step 310, a number of opportunities and a number of defects for the at least one metric may be determined based on the metric definition. For example, the metric definition may define what constitutes an opportunity and what constitutes a defect for the particular metric. Thus, based on the metric definition and based on data relating to the business process to which the metric applies, the system may determine the number of opportunities and the number of defects for the metric. Such determining may include, for instance, retrieving and/or analyzing statistics related to the business process, such as metric-specific opportunity and defect statistics.

In one or more additional arrangements, determining a number of opportunities and a number of defects for the at least one metric further may include measuring the number of opportunities and the number of defects for the at least one metric based on the metric definition. For instance, the system may be configured to monitor automatically the business process and/or measure automatically, based on the metric definition, the number of opportunities and the number of defects in the business process. Such automatic monitoring and/or automatic measurement may vary from metric to metric, as each metric may be concerned with different aspects of a business process. For example, if a metric measured compliance with a customer information privacy policy applied to the example customer support business process discussed above, and the customer information privacy policy prohibited customer support associates from transferring files from a computer system owned, operated, and/or maintained by the financial institution to a removable media device (e.g., a diskette or a USB key), then a system implementing one or more aspects of the disclosure may monitor automatically and/or measure automatically one or more computer systems owned, operated, and/or maintained by the financial institution to determine whether any attempts to transfer files from such computer systems have occurred.

In step 315, a first sigma score for the at least one metric may be determined based on the number of opportunities and the number of defects. For example, a first sigma score may be determined by calculating the inverse of the standard normal cumulative distribution of [1−(number of defects)/(number of opportunities)] and then adding 1.5 to the calculated inverse. Performing such a calculation may produce a sigma score, where a higher sigma score represents a fewer number of defects in the process according to the metric, and where a lower sigma score represents a greater number of defects in the process according to the metric.

Additionally or alternatively, a sigma score may be calculated using a spreadsheet and/or formula. For example, a system may use a formula, such as "NORMSINV" to calculate the inverse of the standard normal cumulative distribution. Such a formula thus may be expressed as "=NORMSINV(1−([number of opportunities]/[number of defects]))+1.5".

In step 320, a second sigma score for the at least one business process may be determined. For example, where the business process is evaluated against only one metric, a second sigma score for the business process may be determined to be the first sigma score. On the other hand, where the business process is evaluated against a plurality of metrics, a second sigma score for the business process may be determined by averaging the first sigma score with one or more additional sigma scores, the one or more additional sigma scores corresponding to one or more additional metrics for the business process.

Additionally or alternatively, a second sigma score for at least one business process may be determined by computing a sigma score (e.g., using the formula described above) based on the total number of opportunities and the total number of defects with regard to all of the plurality of metrics against which the at least one business process may be evaluated. For example, if a process were evaluated against three metrics, and the first metric measured 7 defects in 330 opportunities, the second metric measured 4 defects in 1024 opportunities, and the third metric measured 2 defects in 187 opportunities, the sigma score for the process might be calculated based on the total number of opportunities and the total number of defects with regard to all of the plurality of metrics against which the business process is evaluated. Thus, in this example, the sigma score for the process might be calculated to be 1.5 plus the inverse of the standard normal cumulative distribution of [1−(7+4+2)/(330+1024+187)], or 3.889.

In step 325, a third sigma score for at least one business unit may be determined, and the at least one business unit may implement the at least one business process. For example, where a business unit implementing the business process implements no other business processes, the third sigma score for the business unit may be determined to be the second sigma score. On the other hand, where the business unit implements a plurality of business processes, a third sigma score for the business unit may be determined by averaging the second sigma score with one or more additional sigma scores, the one or more additional sigma scores corresponding to one or more additional metrics for the business unit and/or one or more additional metrics for one or more additional business processes implemented by the business unit.

Additionally or alternatively, a third sigma score for at least one business unit may be determined by computing a sigma score (e.g., using the formula described above) based on the total number of opportunities and the total number of defects with regard to all of the plurality of business processes that may be implemented by the at least one business unit. For example, if a business unit included three processes (e.g., the "Division 1" business unit and its three processes in the sample dashboard report illustrated in FIG. 4, which is further described below), and 123 opportunities and 38 defects were measured and/or determined for the first process (e.g., "Approval 1"), 10 opportunities and 3 defects were measured and/or determined for the second process (e.g., "Review 2"), and 16 opportunities and 8 defects were measured and/or determined for the third process (e.g., "Support 3"), the sigma score for the business unit might be calculated based on the total number of opportunities and the total number of defects with regard to all of the plurality of business processes that may be implemented by the business unit. Thus, in this example, the sigma score for the business unit might be calculated to be 1.5 plus the inverse of the standard normal cumulative distribution of [1−(123+10+16)/(38+3+8)], or 1.94.

In step 330, a fourth sigma score for at least one business segment may be determined, and the at least one business segment may manage the at least one business unit. For example, where a business segment managing the business unit manages no other business units, the fourth sigma score for the business segment may be determined to be the third sigma score. On the other hand, where the business segment manages a plurality of business units, a fourth sigma score for the business segment may be determined by averaging the third sigma score with one or more additional sigma scores, the one or more additional sigma scores corresponding to one or more additional metrics for the business segment and/or one or more additional metrics for one or more additional business processes implemented by a plurality of business units managed by the business segment.

Additionally or alternatively, a fourth sigma score for the at least one business segment may be determined by computing a sigma score (e.g., using the formula described above) based on the total number of opportunities and the total number of defects with regard to all of the plurality of the business units that may be managed by the at least one business segment. For example, if a business segment managed a plurality of business units (e.g., the "Segment 2" business segment and its plurality of business units in the sample dashboard report illustrated in FIG. 5, which is further described below), and 66811 opportunities and 72 defects were measured and/or determined for all of the plurality of business units managed by the business segment, the sigma score for the business segment might be calculated based on the total number of opportunities and the total number of defects with regard to all of the plurality of business units that may be managed by the business unit. Thus, in this example, the sigma score for the business segment might be calculated to be 1.5 plus the inverse of the standard normal cumulative distribution of [1−(66811/72)], or 4.57.

In step 335, a dashboard report may be generated, and the dashboard report may include the first sigma score, the second sigma score, the third sigma score, and/or the fourth sigma score. For example, a system implementing one or more aspects of the disclosure may generate a dashboard report, and the dashboard report may include one or more of the computed sigma scores (e.g., the first sigma score, the second sigma score, the third sigma score, and/or the fourth sigma score). Additionally or alternatively, the dashboard report may include a breakdown of the sigma scores at different levels of abstraction. For instance, the dashboard report may include an overall sigma score for the business segment, and subsequently may include one or more sigma scores for each of the one or more business units managed by the business segment, and subsequently may include one or more sigma scores for each of the one or more business processes implemented by the one or more business units, and subsequently may include one or more sigma scores for each of the one or more metrics measuring one or more aspects of each of the business processes.

In one or more additional arrangements, a dashboard report may identify one or more additional business processes, business units, and/or business segments requiring oversight, as based on one or more additional sigma scores corresponding to the one or more additional business processes, business units, and/or business segments. For example, where a sigma score for a metric, business process, business unit, or business segment is below a predetermined threshold, that sigma score (and its corresponding metric, business process, business unit, or business segment) may be flagged for review and/or process improvement. Additionally or alternatively, when a sigma score is flagged for review and/or process improvement, an automatic report may be generated and/or transmitted to one or more managing users. In at least one arrangement, the system additionally may generate an action plan to increase one or more sigma scores based on one or more metric definitions. For instance, if a metric corresponding to compliance with a privacy regulation produces a low sigma score, the system may generate an action plan to improve compliance with the privacy regulation to increase the sigma score (e.g., the system may generate an action plan, such as, "Greater care must be taken in recording and/or disposing of customer account numbers. The proper recording and/or disposing of customer account numbers should be emphasized to a greater degree in the training of customer support associates.").

Figure 4:
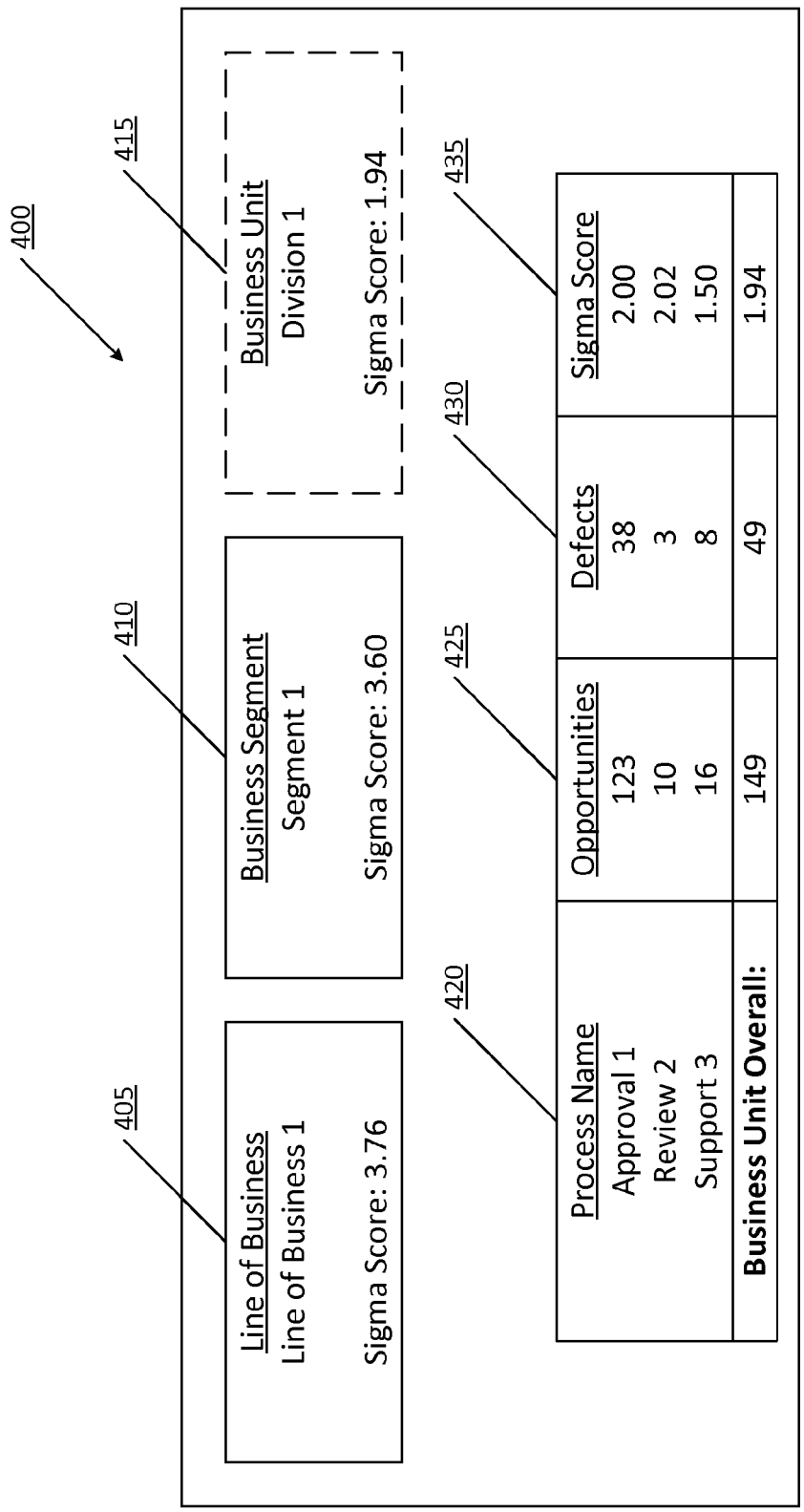
FIG. 4 illustrates a sample dashboard report for a plurality of business processes according to one or more aspects described herein.

FIG. 4 illustrates a sample dashboard report for a plurality of business processes according to one or more aspects described herein. According to one or more aspects, the user interfaces described herein may be implemented by software executed on one or more computers, such as computing device 101, and/or in a network environment, such as network environment 200.

In one or more configurations, user interface 400 may include compliance information, statistical information, and/or other information about one or more business processes, business units, and/or business segments. For example, user interface 400 may include line of business information box 405. Line of business information box 405 may contain compliance information about a line of business, and a line of business may represent an internal division within an organization, such as a financial institution, that includes one or more business segments. Thus, as in the example line of business information box 405 illustrated in FIG. 4, line of business information box 405 may include the name of a line of business (e.g., "Line of Business 1") and a sigma score for the line of business (e.g., "3.76"). In this example, the sigma score for the line of business may represent an average of the one or more sigma scores for the one or more business segments included in the line of business, or the sigma score for the line of business may represent a sigma score calculated based on the total number of opportunities and the total number of defects with regard to all of the plurality of business segments that may be included in the line of business. Such a calculation may be similar to the sigma score calculations further described above with respect to business units and/or business segments.

In at least one configuration, user interface 400 further may include business segment information box 410. Business segment information box 410 may contain compliance information about a business segment. As further described herein, a business segment may represent an internal division within an organization, such as a financial institution, that includes one or more business units. Thus, as in the example business segment information box 410 illustrated in FIG. 4, business segment information box 410 may include the name of a business segment (e.g., "Segment 1") and a sigma score for the business segment (e.g., "3.60"). In this example, the sigma score for the business segment may represent an average of the one or more sigma scores for the one or more business units included in the business segment, or the sigma score for the business segment may represent a sigma score calculated based on the total number of opportunities and the total number of defects with regard to all of the plurality of business units that may be included in the business segment. Such a calculation may be performed in a manner further described above with respect to FIG. 3.

In at least one configuration, user interface 400 further may include business unit information box 415. Business unit information box 415 may contain compliance information about a business unit. As further described herein, a business unit may represent an internal division with an organization, such as a financial institution, that implements one or more business processes. Thus, as in the example business unit information box 415 illustrated in FIG. 4, business unit information box 415 may include the name of a business unit (e.g., "Division 1") and a sigma score for the business unit (e.g., "1.94"). In this example, the sigma score for the business unit may represent an average of the one or more sigma scores for the one or more business processes implemented by the business unit, or the sigma score for the business unit may represent a sigma score calculated based on the total number of opportunities and the total number of defects with regard to all of the plurality of business processes that may be implemented by the business unit. Such a calculation may be performed in a manner further described above with respect to FIG. 3.

In at least one configuration, user interface 400 further may include process listing 420. Process listing may list one or more processes implemented by a business unit, where the business unit is under evaluation and/or is the focus of the dashboard report. Thus, as in the example process listing 420 illustrated in FIG. 4, process listing 420 may include the names of one or more business processes, such as, for instance, "Approval 1," "Review 2," and "Support 3."

In at least one configuration, user interface 400 further may include opportunity listing 425. Opportunity listing 425 may list a determined and/or measured number of opportunities for each of the processes listed in process listing 420 and/or implemented by a business unit, where the business unit is under evaluation and/or is the focus of the dashboard report. In addition, opportunity listing 425 may include the total number of opportunities for all of the processes listed in process listing 420 and/or implemented by the business unit that is under evaluation and/or is the focus of the dashboard report. Thus, as in the example opportunity listing 425 illustrated in FIG. 4, opportunity listing 425 may include a plurality of amounts, where each amount represents the number of opportunities in a corresponding process, such as, for instance, "123" opportunities for the "Approval 1" process, "10" opportunities for the "Review 2" process, "16" opportunities for the "Support 3" process, and "149" opportunities for all of the processes implemented by the "Division 1" business unit that is being evaluated and/or focused on in the dashboard report.

In at least one configuration, user interface 400 further may include defect listing 430. Defect listing 430 may list a determined and/or measured number of defects for each of the processes listed in process listing 420 and/or implemented by a business unit, where the business unit is under evaluation and/or is the focus of the dashboard report. In addition, defect listing 430 may include the total number of defects for all of the processes listed in process listing 420 and/or implemented by the business unit that is under evaluation and/or is the focus of the dashboard report. Thus, as in the example defect listing 430 illustrated in FIG. 4, defect listing 430 may include a plurality of amounts, where each amount represents the number of defects in a corresponding process, such as, for instance, "38" defects for the "Approval 1" process, "3" defects for the "Review 2" process, "8" defects for the "Support 3" process, and "49" defects for all of the processes implemented by the "Division 1" business unit that is being evaluated and/or focused on in the dashboard report.

In at least one configuration, user interface 400 further may include risk score listing 435. Risk score listing 435 may list a determined and/or calculated risk score for each of the processes listed in process listing 420 and/or implemented by a business unit, where the business unit is under evaluation and/or is the focus of the dashboard report. In addition, risk score listing 435 may include an overall risk score for the business unit that is under evaluation and/or is the focus of the dashboard report. According to one or more aspects, one or more of the risk scores listed in risk score listing 435 may be sigma scores and/or may be calculated based on a number of opportunities and a number of defects, or based on an average of one or more sigma scores, as further described herein. Thus, as in the example risk score listing 435 illustrated in FIG. 4, risk score listing 435 may include a plurality of amounts, where each amount represents the determined and/or calculated risk score for a corresponding process, such as, for instance, a sigma score of "2.00" for the "Approval 1" process, a sigma score of "2.02" for the "Review 2" process, a sigma score of "1.50" for the "Support 3" process, and an overall sigma score of "1.94" for the "Division 1" business unit that is being evaluated and/or focused on in the dashboard report.

Figure 5:
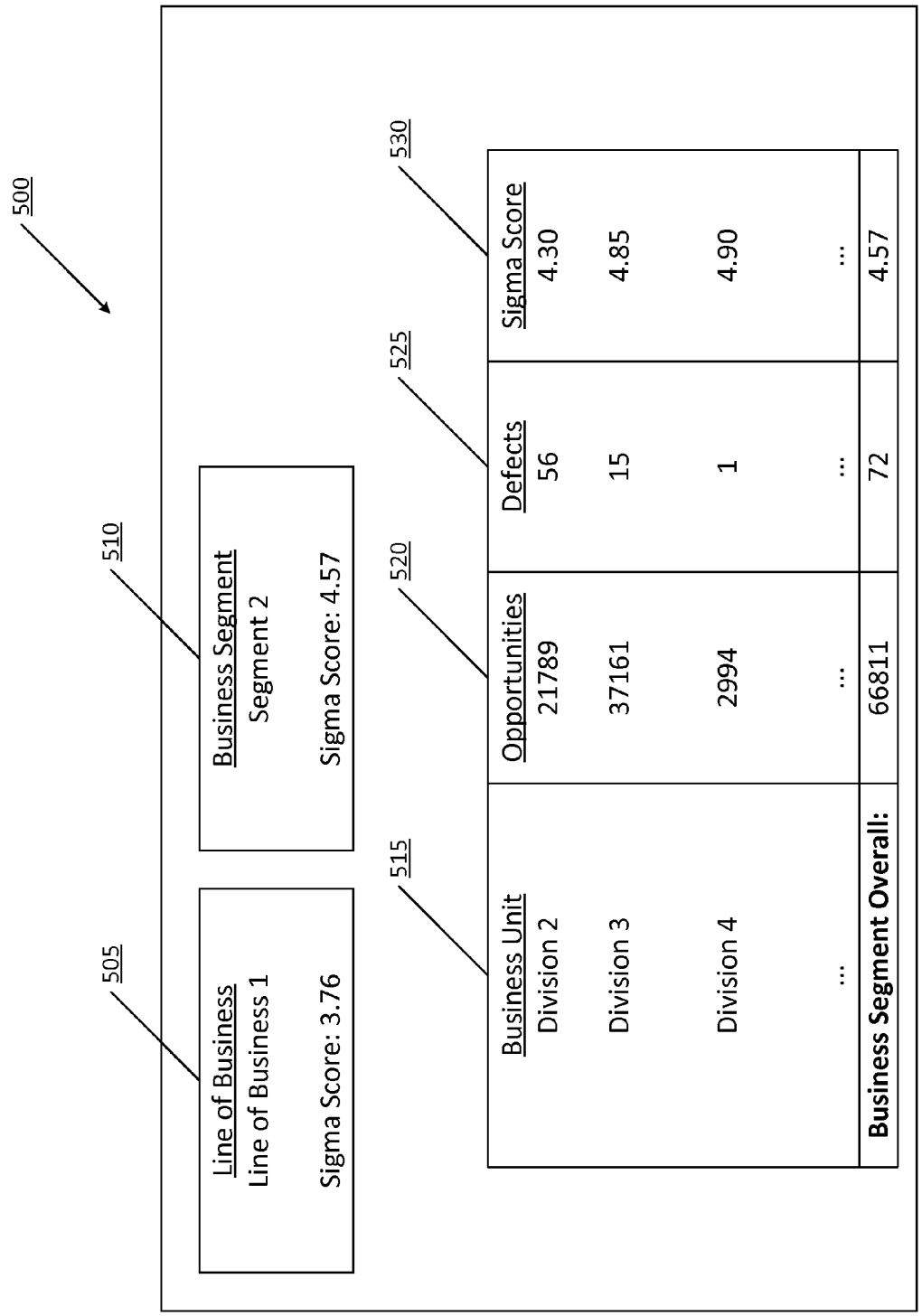
FIG. 5 illustrates a sample dashboard report for a plurality of business units according to one or more aspects described herein.

FIG. 5 illustrates a sample dashboard report for a plurality of business units according to one or more aspects described herein. In one or more configurations, user interface 500 may be similar to user interface 400, except that user interface 500 primarily may include information about and/or analysis of business segments and business units, whereas user interface 400 primarily may include information about and/or analysis of business units and business processes. Thus, like user interface 400, user interface 500 may include compliance information, statistical information, and/or other information about one or more business processes, business units, and/or business segments. For example, user interface 500 may include line of business information box 505 and/or business segment information box 510. Line of business information box 505 may be similar to line of business information box 405, and business segment information box 510 may be similar to business segment information box 410. Thus, line of business information box 505 may include the name of a line of business (e.g., "Line of Business 1") and a sigma score for the line of business (e.g., "3.76"). Business segment information box 510 may include the name of a business segment (e.g., "Segment 2") and a sigma score for the business segment (e.g., "4.57").

In at least one configuration, user interface 500 further may include business unit listing 515, opportunity listing 520, defect listing 525, and/or risk score listing 530. Business unit listing 515 may be similar to process listing 420, although business unit listing 515 may list one or more business units included in and/or managed by a business segment, where the business segment is under evaluation and/or is the focus of the dashboard report. Opportunity listing 520, defect listing 525, and risk score listing 530 may be similar to opportunity listing 425, defect listing 430, and risk score listing 435, respectively, although opportunity listing 520, defect listing 525, and risk score listing 530 may include amounts that correspond to business units (e.g., the one or more business units listed in business unit listing 515) rather than business processes.

Thus, as in the sample dashboard report illustrated in FIG. 5, business unit listing 515 may include the names of one or more business units, such as, for instance, "Division 2" "Division 3," and "Division 4." Business unit listing 515, as well as one or more other listings described herein, also may include an ellipsis to indicate that one or more additional business units are included in the listing and/or managed by the relevant business segment.

In addition, opportunity listing 520 may include a plurality of amounts, where each amount represents the number of opportunities in a corresponding business unit, such as, for instance, "21789" opportunities for the "Division 2" business unit, 37161" opportunities for the "Division 3" business unit, "2994" opportunities for the "Division 4" business unit, and "66811" opportunities for all of the business units managed by the "Segment 2" business segment that is being evaluated and/or focused on in the dashboard report. Defect listing 525 may include a plurality of amounts, where each amount represents the number of defects in a corresponding business unit, such as, for instance, "56" defects for the "Division 2" business unit, "15" defects for the "Division 3" business unit, "1" defect for the "Division 4" business unit, and "72" defects for all of the business units managed by the "Segment 2" business segment that is being evaluated and/or focused on in the dashboard report. Risk score listing 530 also may include a plurality of amounts, where each amount represents the determined and/or calculated risk score for a corresponding business unit, such as, for instance, a sigma score of "4.30" for the "Division 2" business unit, a sigma score of "4.85" for the "Division 3" business unit, a sigma score of "4.90" for the "Division 4" business unit, and an overall sigma score of "4.57" for the "Segment 2" business segment that is being evaluated and/or focused on in the dashboard report.

Figure 6:
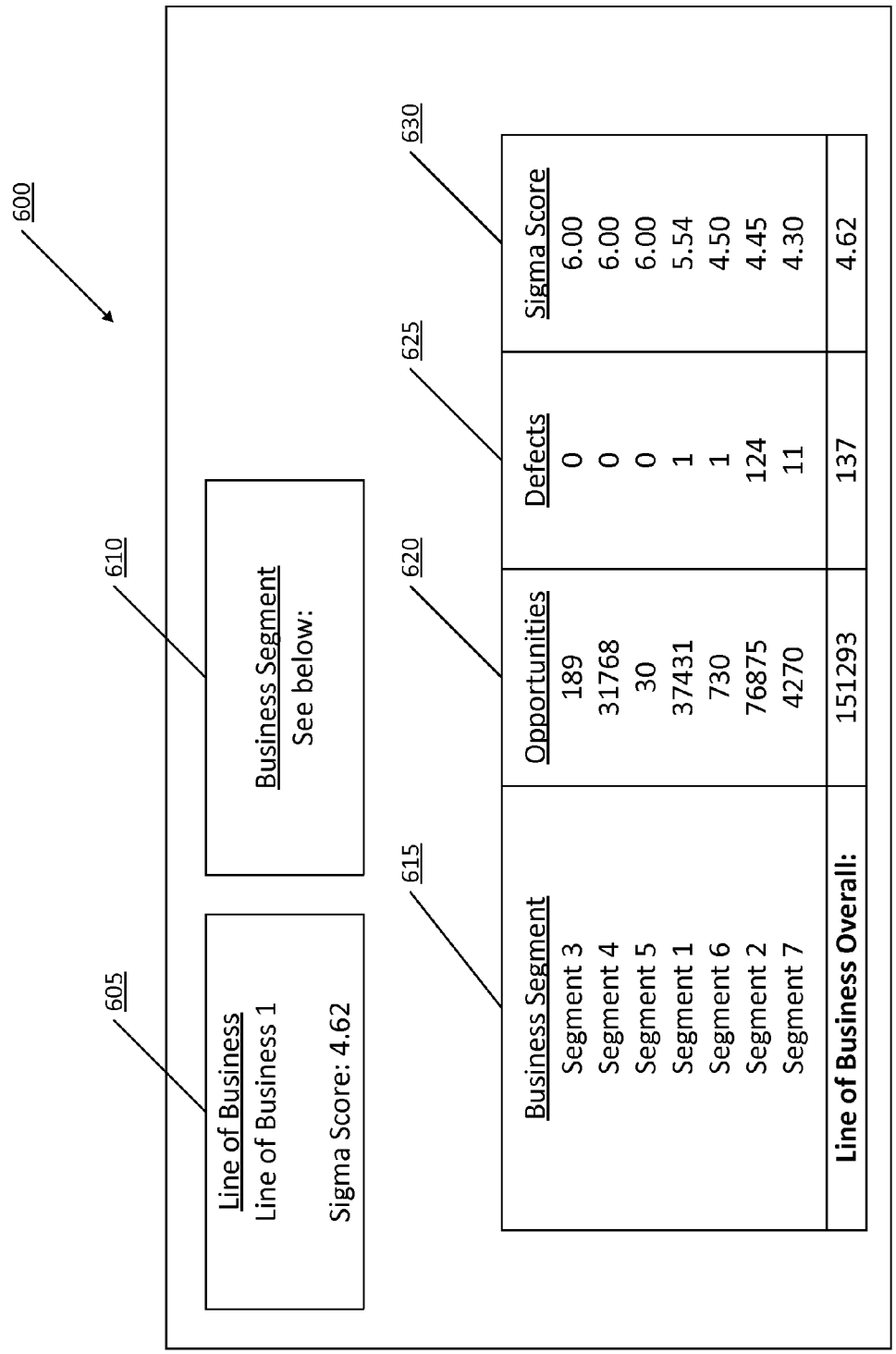
FIG. 6 illustrates a sample dashboard report for a plurality of business segments according to one or more aspects described herein.

FIG. 6 illustrates a sample dashboard report for a plurality of business segments according to one or more aspects described herein. In one or more configurations, user interface 600 may be similar to user interface 500, except that user interface 600 primarily may include information about and/or analysis of one or more lines of business and business segments, whereas user interface primarily may include information about and/or analysis of business segments and business units.

Thus, like user interface 500, user interface 600 may include compliance information, statistical information, and/or other information about one or more business processes, business units, and/or business segments. For example, user interface 600 may include line of business information box 605 and/or business segment information box 610. Line of business information box 605 may be similar to line of business information box 505, and business segment information box 610 may be similar to business segment information box 510. Thus, line of business information box 605 may include the name of a line of business (e.g., "Line of Business 1") and a sigma score for the line of business (e.g., "4.62"). Business segment information box 610 may include the name of a business segment and a sigma score for the business segment, or it may refer a user to other information included in user interface 600.

In at least one configuration, user interface 600 further may include business segment listing 615, opportunity listing 620, defect listing 625, and/or risk score listing 630. Business segment listing 615 may be similar to business unit listing 515, although business segment listing 615 may list one or more business segments included in and/or managed by a line of business, where the line of business is under evaluation and/or is the focus of the dashboard report. Opportunity listing 620, defect listing 625, and risk score listing 630 may be similar to opportunity listing 520, defect listing 525, and risk score listing 530, respectively, although opportunity listing 620, defect listing 625, and risk score listing 630 may include amounts that correspond to business segments (e.g., the one or more business segments listed in business segment listing 615) rather than business units.

Thus, as in the sample dashboard report illustrated in FIG. 6, business segment listing 615 may include the names of one or more business segments, such as, for instance, "Segment 3," "Segment 4," "Segment 5," "Segment 1," "Segment 6," "Segment 2," and "Segment 7." Opportunity listing 620 may include a plurality of amounts, where each amount represents the number of opportunities in a corresponding business segment, such as, for instance, "189" opportunities for the "Segment 3" business segment, "31768" opportunities for the "Segment 4" business segment, "30" opportunities for the "Segment 5" business segment, "37431" opportunities for the "Segment 1" business segment, "730" opportunities for the "Segment 6" business segment, "76875" opportunities for the "Segment 2" business segment, "4270" opportunities for the "Segment 7" business segment, and "151293" opportunities for all of the business segments included in and/or managed by the "Line of Business 1" line of business that is being evaluated and/or focused on in the dashboard report.

In addition, defect listing 625 may include a plurality of amounts, where each amount represents the number of defects in a corresponding business segment, such as, for instance, "0" defects for the "Segment 3" business segment, "0" defects for the "Segment 4" business segment, "0" defects for the "Segment 5" business segment, "1" defect for the "Segment 1" business segment, "1" defect for the "Segment 6" business segment, "124" defects for the "Segment 2" business segment, "11" defects for the "Segment 7" business segment, and "137" defects for all of the business segments included in and/or managed by the "Line of Business 1" line of business that is being evaluated and/or focused on in the dashboard report. Risk score listing 630 also may include a plurality of amounts, where each amount represents the determined and/or calculated risk score for a corresponding business segment, such as, for instance, a sigma score of "6.00" for the "Segment 3" business segment, a sigma score of "6.00" for the "Segment 4" business segment, a sigma score of "6.00" for the "Segment 5" business segment, a sigma score of "5.54" for the "Segment 1" business segment, a sigma score of "4.50" for the "Segment 6" business segment, a sigma score of "4.45" for the "Segment 2" business segment, a sigma score of "4.30" for the "Segment 7" business segment, and an overall sigma score of "4.62" for the "Line of Business 1" line of business that is being evaluated and/or focused on in the dashboard report.

According to one or more aspects, and as further described above, compliance with laws, regulations, and/or policies thus may be evaluated. For example, a user, such as a risk manager, may be presented with one or more user interfaces. The one or more user interfaces may allow the user to configure the system by inputting (or modifying) a metric definition for at least one metric. For instance, a user may input, and the system thus may receive, a metric definition for a metric that measures how often a consumer privacy policy is violated when the process is performed. The consumer privacy policy may require that each incoming caller be warned that the call may be monitored or recorded. Thus, the metric definition may define an opportunity as an incoming call, and the metric definition may define a defect as a call in which the incoming caller is not warned that the call may be monitored or recorded.

Having received the metric definition, the system then may determine, based on the metric definition, a number of opportunities and a number of defects in the process over a particular period of time, such as one month. This determination may be performed automatically by the system, or this determination may be based on input the system receives from a user. For instance, with respect to the example consumer privacy policy described in the example above, automatic determination may occur where the system is configured to monitor incoming calls, analyze a conversation that occurs during each call, and determine whether the incoming caller was warned that that the call may be monitored or recorded. Alternatively, a user may measure opportunities and defects in the process manually by listening in on the calls and collecting statistics about whether incoming callers were warned, and subsequently, the user may enter the collected statistics into the system. The system then may determine a number of opportunities and a number of defects based on the input the system receives from the user and based on the metric definition.

Once the number of opportunities and the number of defects for the metric are determined, the system may determine a first sigma score for the metric using a calculation further described above. Similarly, the system may determine a second sigma score for the process, a third sigma score for the business unit implementing the process, and a fourth sigma score for the business segment managing the business unit. Thereafter, the system may generate a report that includes the first sigma score, the second sigma score, the third sigma score, and the fourth sigma score, as further described above. Such a report may assist the organization and/or a risk manager in determining the level of compliance of the organization's activities with one or more laws, regulations, and/or policies.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computer-implemented method, comprising:

receiving, by at least one computer, a metric definition for at least one metric, the at least one metric measuring an aspect of at least one business process over a predetermined period of time, wherein the metric definition includes a definition of an opportunity and a definition of a defect within the at least one business process, wherein the definition of the opportunity defines a compliance policy associated with the at least one business process, and wherein the definition of the defect defines what constitutes a violation of the compliance policy associated with the at least one business process;

determining, by the at least one computer, based on the metric definition, a number of opportunities and a number of defects for the at least one metric, wherein the number of opportunities corresponds to a total number of opportunities that are evaluated under the compliance policy associated with the at least one business process during the predetermined period of time, and wherein the number of defects corresponds to a total number of violations of the compliance policy associated with the at least one business process during the predetermined period of time;

determining, by the at least one computer, based on the number of opportunities and the number of defects, a first sigma score for the at least one metric;

determining, by the at least one computer, a second sigma score for the at least one business process;

determining, by the at least one computer, a third sigma score for at least one business unit, the at least one business unit implementing the at least one business process;

determining, by the at least one computer, a fourth sigma score for at least one business segment, the at least one business segment managing the at least one business unit; and generating, by the at least one computer, a report, the report including the first sigma score, the second sigma score, the third sigma score, and the fourth sigma score.

2. The method of claim 1, wherein receiving a metric definition for at least one metric includes receiving, using the at least one computer, an input representative of an approval for the at least one metric from a managing user.

3. The method of claim 1, wherein determining a number of opportunities and a number of defects for the at least one metric includes measuring, using the at least one computer, based on the metric definition, the number of opportunities and the number of defects for the at least one metric.

4. The method of claim 1, wherein the report identifies one or more additional business processes requiring oversight based on one or more additional sigma scores corresponding to the one or more additional business processes.

5. The method of claim 1, wherein the aspect of the at least one business process measured by the at least one metric represents a compliance concern.

6. The method of claim 5, wherein the compliance concern arises from a legal obligation.

7. The method of claim 5, wherein the compliance concern arises from an internal policy.

8. The method of claim 1, wherein determining the first sigma score for the at least one metric comprises calculating an inverse of the standard normal cumulative distribution of (1−((number of defects)/(number of opportunities)))+1.5.

9. The method of claim 1, wherein the at least one business process comprises a customer support process performed by a financial institution in which incoming telephone calls from customers are routed to a plurality of customer service representatives that assist the customers in resolving issues with at least one of a product and a service provided by the financial institution.

10. The method of claim 1, further comprising:

generating, using the at least one computer, an action plan if one or more of the first sigma score, second sigma score, third sigma score, and fourth sigma score is below a pre-determined threshold.

11. One or more non-transitory computer-readable media having computer-executable instructions stored thereon, that when executed by one or more computers, cause the one or more computers to perform:

receiving a metric definition for at least one metric, the at least one metric measuring an aspect of at least one business process over a predetermined period of time, wherein the metric definition includes a definition of an opportunity and a definition of a defect within the at least one business process, wherein the definition of the opportunity defines a compliance policy associated with the at least one business process, and wherein the definition of the defect defines what constitutes a violation of the compliance policy associated with the at least one business process;

determining, based on the metric definition, a number of opportunities and a number of defects for the at least one metric, wherein the number of opportunities corresponds to a total number of opportunities that are evaluated under the compliance policy associated with the at least one business process during the predetermined period of time, and wherein the number of defects corresponds to a total number of violations of the compliance policy associated with the at least one business process during the predetermined period of time;

determining, based on the number of opportunities and the number of defects, a first sigma score for the at least one metric;

determining a second sigma score for the at least one business process;

determining a third sigma score for at least one business unit, the at least one business unit implementing the at least one business process;

determining a fourth sigma score for at least one business segment, the at least one business segment managing the at least one business unit; and generating a report, the report including the first sigma score, the second sigma score, the third sigma score, and the fourth sigma score.

12. The non-transitory computer-readable media of claim 11, wherein receiving a metric definition for at least one metric includes receiving an input representative of an approval for the at least one metric from a managing user.

13. The non-transitory computer-readable media of claim 11, wherein determining a number of opportunities and a number of defects for the at least one metric includes measuring, based on the metric definition, the number of opportunities and the number of defects for the at least one metric.

14. The non-transitory computer-readable media of claim 11, wherein the report identifies one or more additional business processes requiring oversight based on one or more additional sigma scores corresponding to the one or more additional business processes.

15. The non-transitory computer-readable media of claim 11, wherein the aspect of the at least one business process measured by the at least one metric represents a compliance concern.

16. The non-transitory computer-readable media of claim 15, wherein the compliance concern arises from a legal obligation.

17. The non-transitory computer-readable media of claim 15, wherein the compliance concern arises from an internal policy.

18. An apparatus, comprising:
- at least one processor; and
- at least one memory storing computer-readable instructions that, when executed by the at least one processor, cause the apparatus to perform:
  - receiving a metric definition for at least one metric, the at least one metric measuring an aspect of at least one business process over a predetermined period of time, wherein the metric definition includes a definition of an opportunity and a definition of a defect within the at least one business process, wherein the definition of the opportunity defines a compliance policy associated with the at least one business process, and wherein the definition of the defect defines what constitutes a violation of the compliance policy associated with the at least one business process;
  - determining, based on the metric definition, a number of opportunities and a number of defects for the at least one metric, wherein the number of opportunities corresponds to a total number of opportunities that are evaluated under the compliance policy associated with the at least one business process during the predetermined period of time, and wherein the number of defects corresponds to a total number of violations of the compliance policy associated with the at least one business process during the predetermined period of time;
  - determining, based on the number of opportunities and the number of defects, a first sigma score for the at least one metric;
  - determining a second sigma score for the at least one business process;
  - determining a third sigma score for at least one business unit, the at least one business unit implementing the at least one business process;
  - determining a fourth sigma score for at least one business segment, the at least one business segment managing the at least one business unit; and
  - generating a report, the report including the first sigma score, the second sigma score, the third sigma score, and the fourth sigma score.

19. The apparatus of claim 18, wherein receiving a metric definition for at least one metric includes receiving an input representative of an approval for the at least one metric from a managing user.

20. The apparatus of claim 18, wherein determining a number of opportunities and a number of defects for the at least one metric includes measuring, based on the metric definition, the number of opportunities and the number of defects for the at least one metric.

21. The apparatus of claim 18, wherein the report identifies one or more additional business processes requiring oversight based on one or more additional sigma scores corresponding to the one or more additional business processes.

22. The apparatus of claim 18, wherein the aspect of the at least one business process measured by the at least one metric represents a compliance concern.

23. The apparatus of claim 22, wherein the compliance concern arises from a legal obligation.

24. The apparatus of claim 22, wherein the compliance concern arises from an internal policy.

* * * * *